United States Patent [19]

Price et al.

[11] 4,311,480

[45] Jan. 19, 1982

[54] DYEING COMPOSITION

[75] Inventors: Ian M. Price, Glossop; James K. Skelly, Wilmslow, both of England

[73] Assignee: Ciba-Geigy Corporation, Ardsley, N.Y.

[21] Appl. No.: 146,537

[22] Filed: May 2, 1980

[30] Foreign Application Priority Data

May 4, 1979 [GB] United Kingdom ............... 79155/79

[51] Int. Cl.$^3$ ............................................. D06P 67/00
[52] U.S. Cl. ......................................... 8/527; 8/613; 8/616; 8/532; 8/533; 8/563; 8/922
[58] Field of Search ................... 8/613, 527, 616, 532, 8/533, 922

[56] References Cited

U.S. PATENT DOCUMENTS

| | | | |
|---|---|---|---|
| B 507,476 | 2/1976 | Mueller et al. | 8/62 |
| 3,756,773 | 9/1973 | Isharani | 8/613 |
| 4,072,465 | 2/1978 | Daeuble | 8/582 |
| 4,080,166 | 3/1978 | Muller et al. | 8/589 |

FOREIGN PATENT DOCUMENTS

| | | |
|---|---|---|
| 806441 | 2/1961 | United Kingdom . |
| 1034048 | 6/1966 | United Kingdom . |
| 1481862 | 8/1977 | United Kingdom . |
| 1481863 | 8/1977 | United Kingdom . |
| 1483719 | 8/1977 | United Kingdom . |
| 1491935 | 11/1977 | United Kingdom . |
| 1507520 | 4/1978 | United Kingdom . |
| 1507931 | 4/1978 | United Kingdom . |

OTHER PUBLICATIONS

Page 659, Fischer–Bobsien Lexikon (1975).
American Dyestuff Reporter, p. 35, Sep. 1973, J. J. Vinyard: Liquid Dyes.

*Primary Examiner*—A. Lionel Clingman
*Attorney, Agent, or Firm*—Edward McC. Roberts

[57] ABSTRACT

A liquid composition suitable for the domestic dyeing of polyester fabrics which comprises a liquid disperse dye, a diffusion accelerant, an anionic or non-ionic emulsifying agent and a compatible textile lubricant.

11 Claims, No Drawings

DYEING COMPOSITION

The present invention relates to a dyeing composition, more particularly a dyeing composition for dyeing polyester textile fibres, including polyester blends.

While the domestic dyeing of textile fabrics, such as those made of cotton and nylon, may be carried out relatively easily, there are difficulties in dyeing polyester and polyester blend fibres. Dyes only diffuse slowly into polyester at the boil, but the dyeing rate can be increased by dyeing at temperatures above the boil.

A large proportion of polyester fibres are normally dyed commercially at temperatures above the boil, however, if they are dyed at the boil it is essential to add a diffusion accelerant to the dyebath in an amount which may vary depending on the circumstances. The diffusion accelerant is added separately from the dye.

Domestic dyeing of polyester would only be possible at the boil and a diffusion accelerant would be needed in order to carry out the dyeing in acceptable times. Under these conditions, creasing of garments would be a problem. Diffusion accelerants are normally insoluble compounds which are difficult to handle, requiring special formulation into self-emulsifiable liquids. We have devised a composition using a suitably formulated diffusion accelerant and dyestuff, incorporating a textile lubricant suitable for use in domestic dyeing of polyester and polyester blend fabrics, which surprisingly overcomes these problems.

According to the present invention, there is provided a liquid composition suitable for domestic dyeing, comprising a liquid disperse dye, a diffusion accelerant, an anionic or non-ionic emulsifying agent and a compatible textile lubricant.

The disperse dye used preferably is a low energy dye with a comparatively low molecular weight. Suitable liquid disperse dyes are the commercially available dyestuff preparations which contain a disperse dye, anionic and/or non-ionic dispersing agents, water and, optionally, other ingredients such as hydrotropic agents, antifrosting agents, antimicrobial agents etc.

The amount of dyestuff may be varied depending on the depth of shade required, for instance by diluting with water.

The diffusion accelerant should be a solvent for the dye, insoluble or only slightly soluble in water, and the affinity of the diffusion accelerant for the dye should be less than that of the polyester fibre for the dye at the temperature for fixation.

Examples of such diffusion accelerants are:

1. alcohols such as benzyl alcohol and unsubstituted and substituted phenoxy alkanols, for example, 2-phenoxyethanol, monochlorophenoxyethanol, methylphenoxypropanol, ethylphenoxypropanol, monochlorophenoxypropanol, and preferably dichlorophenoxypropanol especially 2,4-dichlorophenoxypropanol, and monochlorophenoxyethanol.

2. esters such as $C_1$-$C_4$ alkyl benzoates for example methyl, ethyl and butyl benzoate.

3. alkyl and aryl salicylates for example methyl, ethyl, phenyl and benzyl salicylate.

4. chlorinated benzenes for example monochlorobenzene, 1,2-dichlorobenzene and 1,2,4-trichlorobenzene.

5. Aromatic Hydrocarbons such as 1-methyl naphthalene.

Preferred diffusion accelerants particularly for domestic dyeing are those which have little or no odour, such as those listed under 1 above.

Anionic emulsifying agents that can be used include sulphated or sulphonated higher aliphatic fatty acids having advantageously 8 to 20 carbon atoms, or their salts and esters, e.g. sulphated ricinoleic acid butyl ester; aromatic sulphonic acids which, optionally, are substituted by straight or branch chained alkyl radicals having up to 20 carbon atoms, e.g. benzene, methylbenzene, dimethylbenzene, 1-methyl-undecylbenzene, nonylphenyl, naphthalene, methylnaphthalene and tetrahydronaphthalene sulphonic acid, or mixtures of these sulphonic acids or salts; also sulphated polyglycol ethers of alcohols having 8 to 14 carbon atoms with 1 to 20 mols and, preferably, 2 to 5 mols of ethylene oxide or propylene oxide, which preferably have —$CH_2$—$CH_2$—O— groups as recurring structural elements and the terminal hydroxyl group of which is sulphated, and sulphated polyglycol ethers of higher alkylated phenols containing 1 to 20 and preferably 2 to 3 ether oxygen atoms, the alkyl radical of which phenols preferably has 8 to 14 carbon atoms. Examples of anionic surface-active agents include a butylated naphthalene sulphonate, a naphthalene sulphonic acid formaldehyde condensate, a sulphonated vegetable oil and an alkyl phenol polyglycol ether sulphate.

Suitable non-ionic emulsifying agents are, in particular surface active ethylene oxide addition products of organic hydroxyl, carboxyl, amino or amido compounds containing aliphatic hydrocarbon radicals having, in all, at least 8 carbon atoms, or mixtures of such substances. These are obtained when at least 3 equivalents and, preferably, more ethylene oxide are added, whereby single substituted epoxides such as styrene oxide and propylene oxide can be built in. As basic substances, higher fatty alcohols, i.e. alkanols having 8 to 20 carbon atoms, fatty acids having 8 to 20 carbon atoms, alkyl phenols having one or several alkyl substituents which contain together at least 8 carbon atoms, primary or secondary, mono- or poly-basic amines having aliphatic and/or cycloaliphatic hydro-carbon radicals with at least 8 carbon atoms, particularly alkanolamines having such radicals, also alkanolamides, aminoalkylamides and aminoalkyl esters of higher aliphatic carboxylic acids and higher alkylated aryloxy carboxylic acids, can be used. The number of alkyleneoxy groups in these polyglycol ethers should lend hydrophilic properties to the latter and should be so great that the compounds are at least easily dispersible and, preferably, soluble in water. Depending on the type and composition of the lipophilic component of these compounds, the number of alkyleneoxy groups, principally ethyleneoxy groups, should be in the range of from one to 100 and, preferably 5 to 20. The use of technical mixtures of these substances is particularly favourable. Examples of non-ionic agents include an ethylene oxide condensate of stearyldiethylenetriamine and styrene oxide, and also an ethylene oxide condensate of stearyldiethylenetriamine.

Other suitable emulsifying agents are those based on protective colloids, e.g. casein, especially in the form of its ammonium salt.

The amount of emulsifying agent is normally at least 25% by weight based on the weight of diffusion accelerant. Higher amounts of emulsifying agent could be used, but this would reduce the overall dye yield.

Combinations of different emulsifying agents may be used and often can prove to be beneficial. For example an anionic emulsifying agent may be used with a protective colloid.

The lubricant should be anionic or non-ionic in order to be compatible with disperse dyes, and it should not affect shade and light fastness or fastness to rubbing. Examples of suitable textile lubricants which can be used in the dyeing compositions of the invention are: a stearic acid diethanolamide, sulphated and sulphited oils, both of natural and synthetic origin, polyethylene emulsions, polyethylene glycol esters, ethoxylated lanolin derivatives, ethoxylated alcohols, and fatty acid alkylolamides.

The presence of the lubricant in the composition enables garments to be dyed without being creased and especially without the formation of hard creases.

The amount of lubricant in the composition may be from 2.5% to 15% by weight, preferably from 5% to 10% by weight, based on the total weight of the composition.

In addition to the lubricant, a softener may be incorporated into the composition as its presence would help to prevent the fabrics becoming harsh at the boil.

The present invention also provides a process for dyeing polyester fabrics and fibres which comprises immersing the fabric or fibre into a dyebath containing a composition as hereinbefore described at 30° C. to 40° C. bringing to the boil and dyeing for a suitable period of time, for instance from 30 minutes to 2 hours. After cooling, the fibre or fabric is rinsed and if desired, subjected to an alkaline scour to improve the fastness, especially the rubbing fastness.

If it is desired to dye a polyester blend, for example polyester/cotton or polyester/wool, the polyester is dyed first and then the cotton or wool is dyed by a separate process using a suitable dye.

The following Examples further illustrate the present invention where parts are given by weight.

EXAMPLE 1

A composition of the present invention was made up from the following constituents:
48 parts 2,4-dichlorophenoxy propanol,
12 parts alkyl phenol polyglycol ether sulphate,
8 parts stearic acid diethanolamide,
32 parts of the black dyestuff consisting of
19% of the dyestuff of the formula

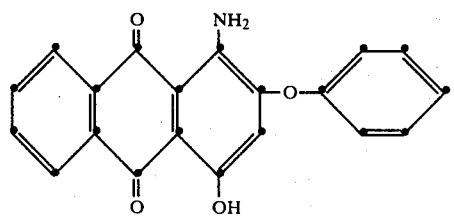

24% of the dyestuff of the formula

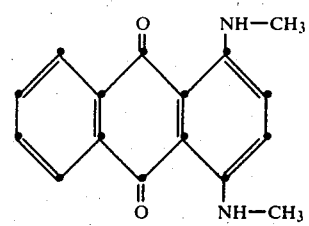

7% of the dyestuff of the formula

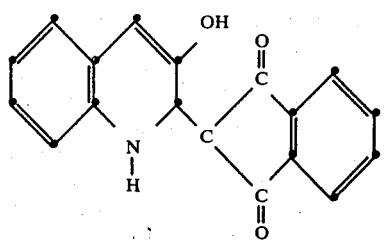

2.5% of the condensation product from 2 moles of naphthalenesulphonic acid and 1 mole of formaldehyde,
1.0% of a fatty alcohol polyglycol ether (cetyl/stearyl alcohol etherified with 25 moles of ethylene oxide),
10% of urea,
11.8% of 1,2 propylene glycol,
1% of a 35% aqueous formalin solution,
23.7% of water.

EXAMPLE 2

A composition was made up from the following constituents:
48 parts dichlorophenoxypropanol,
10 parts alkylphenol polyglycol ether sulphate,
10 parts sulphated blend of synthetic esters,
32 parts the black dye used in Example 1.

EXAMPLE 3

A composition was made up from the following constituents:
35 parts butyl benzoate,
15 parts sulphated blend of synthetic esters,
3 parts polyethylene glycol unsaturated fatty acid ester,
47 parts the black dye used in Example 1.

EXAMPLE 4

A composition was made up from the following constituents:
50 parts monochlorophenoxyethanol,
25 parts 9.5% casein solution,
15 parts of the liquid dyestuff formulation, containing
44.4% of the blue dyestuff CI 61110,
0.9% of sodium naphthalene sulphonate condensed with formaldehyde,
2.0% of a fatty alcohol polyglycol ether,
1.0% of 35% aqueous formalin solution,
10.0% of 1.2-propyleneglycol,
13.9% of urea,
0.2% of an antifoaming agent and
27.6% of water,
5 parts alkyl phenol polyglycol ether sulphate,
5 parts stearic acid diethanolamide.

EXAMPLE 5

Example 4 was repeated except that 25 parts of an 11% casein solution was used.

EXAMPLE 6

Example 4 was repeated except that 25 parts of a 14% casein solution was used.

EXAMPLE 7

A composition was made up from the following constituents:
50 parts monochlorophenoxyethanol,
25 parts 9.5% casein solution,
15 parts of the liquid dyestuff formulation, containing
48.1% of the yellow dyestuff CI 47020,
27% of water,
12.4% of urea,
10.0% of 1,2-propyleneglycol,
1.0% of sodium naphthalene sulphonate condensed with formaldehyde,
1.0% of cetyl/stearyl alcohol etherified with 25 mol of ethylene oxide and
0.5% of a preservative,
5 parts alkyl phenol polyglycol ether sulphate,
5 parts stearic acid diethanolamide.

EXAMPLE 8

A composition was made up from the following constituents:
50 parts monochlorophenoxyethanol,
25 parts 9.5% casein solution,
15 parts of the liquid dyestuff formulation, containing
45% of the dyestuff CI 11115,
28% of water
13% of urea
10% of 1,2-propylene glycol,
2% of ligninsulphonate,
2% of a non-ionic polycondensation product consisting of 20% of polypropylene oxide and 80% of polyethylene oxide and having a molecular weight of about 16.500,
5 parts alkyl phenol polyglycol ether sulphate,
5 parts stearic acid diethanolamide.

EXAMPLE 9

The following dyeing process illustrates the dyeing of polyester:

10 g of polyester fabric were immersed in a dyeing vessel containing 250 ml of water, at 40° C. and 2 g of the composition as described in Example 1 was added. Acetic acid was added to adjust the pH to 5.5 and the temperature of the dyeing vessel was increased to 100° C. over approximately 45 minutes. Dyeing was continued at the boil for 1 hour. After cooling the fabric was rinsed in hot and cold water and given an alkaline scour. After drying, the fabric was found to be dyed to an even black shade.

EXAMPLE 10

The following dyeing process illustrates the dyeing of a 67%/33% blend of polyester/cotton:

The polyester portion of the fabric was dyed as described above, but after scouring it was immersed in a second dyeing vessel containing 0.1 g of the black dyestuff CI 35255 in a liquid formulation in 250 ml water. The temperature of this dyeing vessel was raised from 40° C. to 100° C. over 45 minutes, and at 100° C. 2.5 g of sodium chloride was added in 3 portions over 15 minutes. Dyeing was continued at 100° C. for 1 hour. After cooling the fabric was rinsed in cold water. After drying, the fabric was found to be dyed on even black shade.

EXAMPLE 11

Polyester fabric was dyed as in Example 9 using a composition as in Example 1 except that after cooling and rinsing in hot and cold water, it was treated within an aqueous solution of 2 g/l of a composition comprising:
20 parts thiourea dioxide,
10 parts dodecyl benzene sulphonate,
70 parts sodium carbonate.

After drying, the fabric was found to be dyed to an even black shade with good fastness properties.

EXAMPLE 12

10 g of polyester fabric were immersed in a dyeing vessel containing 250 ml of water, at 40° C. and 2 g of the composition described in Example 4 was added. The temperature of the dyeing vessel was increased to 100° C., over approximately 45 minutes. Dyeing was continued at the boil for 30 minutes. After cooling the fabric was rinsed in hot and cold water and given an alkaline scour. After dyeing the fabric was found to be dyed to an even blue shade.

EXAMPLE 13

Example 12 was repeated using 4 g of the composition of Example 4. An even blue dyeing was obtained, but deeper in shade than that of Example 12.

EXAMPLES 14 AND 15

Example 12 was repeated except that the compositions of Examples 5 and 6 were used. Even blue dyeings were obtained.

EXAMPLE 16

Example 12 was repeated except that the composition of Example 7 was used. The fabric was dyed in an even yellow shade.

EXAMPLE 17

Example 12 was repeated except that the composition of Example 8 was used. The fabric was dyed in an even red shade.

What we claim is:

1. A composition containing
   10 to 60% of a liquid disperse dyestuff preparation,
   30 to 55% of a liquid diffusion accelerant,
   5 to 20% of an anionic or non-ionic emulsifying agent and
   2,5 to 15% of a textile lubricant, the percentages being based on the total weight of the composition.

2. A composition of claim 1, containing
   15 to 50% of a liquid disperse dyestuff preparation,
   30 to 50% of a liquid diffusion accelerant,
   7 to 15% of an anionic or non-ionic emulsifying agent and
   3 to 10% of a textile lubricant, the percentages being based on the total weight of the composition.

3. A composition of claim 1, in which the disperse dye is a low energy dye of low molecular weight.

4. A composition of claim 1, in which the diffusion accelerant is 2,4-dichlorophenoxypropanol or monochlorophenoxyethanol.

5. A composition of claim 1, in which the emulsifying agent is an alkyl phenol polyglycol ether sulphate.

6. A composition of claim 1 in which the emulsifying agent is a protective colloid.

7. A composition of claim 6 in which the protective colloid is casein as its ammonium salt.

8. A composition of claim 1 in which the amount of emulsifying agent is at least 25% by weight, based on the weight of diffusion accelerant.

9. A composition of claim 2, in which the textile lubricant is a stearic acid diethanolamide.

10. A process for dyeing polyester fabrics which comprises immersing the fabric into a dyebath containing a composition according to any of claims 1 to 11 at 30° C. to 40° C., bringing to the boil and dyeing for a suitable period of time, followed by cooling and then rinsing and drying the fabric.

11. A process of claim 10, in which the fabric is afterwards subjected to an alkaline scouring process.

* * * * *